United States Patent
Cooley et al.

(10) Patent No.: US 8,015,450 B1
(45) Date of Patent: Sep. 6, 2011

(54) SYSTEMS AND METHODS FOR DETECTING AND AUTOMATICALLY INSTALLING MISSING SOFTWARE COMPONENTS

(75) Inventors: Shaun Cooley, El Segundo, CA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 267 days.

(21) Appl. No.: 12/411,755

(22) Filed: Mar. 26, 2009

(51) Int. Cl.
*G06F 11/00* (2006.01)

(52) U.S. Cl. .................. 714/38.1; 717/173; 717/178

(58) Field of Classification Search .......... 714/38; 717/171, 173, 176, 178
See application file for complete search history.

(56) References Cited

U.S. PATENT DOCUMENTS

| | | | |
|---|---|---|---|
| 7,062,765 B1 * | 6/2006 | Pitzel et al. | 717/177 |
| 7,171,390 B1 * | 1/2007 | Song et al. | 705/52 |
| 7,210,141 B1 * | 4/2007 | Nathan et al. | 717/168 |
| 7,536,683 B2 * | 5/2009 | Zimmerman et al. | 717/162 |
| 7,704,147 B2 * | 4/2010 | Quraishi et al. | 463/42 |
| 2005/0034115 A1 * | 2/2005 | Carter et al. | 717/173 |
| 2005/0144616 A1 * | 6/2005 | Hammond et al. | 717/173 |
| 2005/0198239 A1 * | 9/2005 | Hughes | 709/222 |
| 2007/0198975 A1 * | 8/2007 | Alnas et al. | 717/168 |
| 2010/0005339 A1 * | 1/2010 | Hooks | 714/25 |
| 2010/0064285 A1 * | 3/2010 | Dechovich et al. | 717/173 |
| 2010/0088683 A1 * | 4/2010 | Golender et al. | 717/128 |

* cited by examiner

*Primary Examiner* — Marc Duncan
(74) *Attorney, Agent, or Firm* — Advantedge Law Group

(57) ABSTRACT

Computer-implemented methods and systems for detecting and automatically installing missing software components are disclosed. In one example, an exemplary method for performing such a task may comprise: 1) detecting a failed attempt by a process to load a shared object, 2) identifying the shared object requested in the failed attempt, 3) automatically obtaining the shared object from a network-accessible storage device, 4) installing the shared object on the computing device, and then 5) successfully loading the shared object.

16 Claims, 6 Drawing Sheets

SYSTEMS AND METHODS FOR DETECTING AND AUTOMATICALLY INSTALLING MISSING SOFTWARE COMPONENTS

BACKGROUND

Computer users are often unable to launch an application due to a missing software component. For example, in WINDOWS systems, a user may be unable to launch an application due to a missing dynamic-link library (DLL). When an application unsuccessfully attempts to load a missing DLL, the application may generate a brief error message that cryptically identifies the source of the problem (e.g., "Error opening file, printer.dll missing").

In some cases, users may attempt to resolve errors caused by missing software components by reinstalling the application in question. However, a user may be unable to reinstall an application if the user no longer has a copy of the application's original installation file or if the application in question was not originally packaged with an installation package. This may result in unresolved errors and user frustration. As such, the instant disclosure identifies needs for systems and methods for detecting and automatically installing missing software components.

SUMMARY

The instant disclosure describes various systems and methods for detecting and automatically installing missing software components. As will be described in greater detail below, an exemplary method for performing such a task may comprise: 1) detecting a failed attempt by a process to load a shared object (such as a DLL), 2) identifying the shared object requested in the failed attempt, 3) automatically obtaining the missing shared object from a network-accessible storage device, 4) installing the shared object on the computing device, and then 5) successfully loading the shared object.

In some examples, the system may, upon detecting the failed attempt to load the missing shared object, suspend the requesting process until the system is able to successfully identify, obtain, install, and load the missing shared object. In some examples, the system may detect failed attempts to load missing shared objects using kernel-mode and/or user-mode drivers or hooks.

Depending on the shared object's file type (e.g., depending on whether the shared object represents a standard DLL, COM DLL, or side-by-side DLL), the system may identify the missing shared object based on the shared object's name, version information (e.g., the version number of a DLL, the language version, such as English or German, of the DLL, or the like), an interface identifier associated with the shared object, an object identifier associated with the shared object, at least one import address table entry associated with the shared object (i.e., import address table entries generated by the process that reference the missing DLL), and/or information contained within a manifest of an executable file responsible for launching the process. In some examples, the system may use this information as metadata when requesting a copy of the missing shared object from the network-accessible storage device.

Upon obtaining the shared object, the system may install the shared object on the computing device by simply storing the shared object in an appropriate location on the computing device (e.g., "C:\Windows\System32" for standard DLLs) or by executing an installation package that may, in addition to installing the shared object in question, complete additional installation requirements or install additional dependencies necessary for proper execution of the shared object.

If the system is unable to obtain a copy of the missing shared object from the network-accessible storage device, then the system may store information that identifies the unsuccessful attempt to obtain the missing shared object in a local cache. In some examples, the system may consult this local cache prior to attempting to obtain a missing shared object from the network-accessible storage device in order to determine whether the system has previously unsuccessfully attempted to obtain the shared object in question, thereby avoiding the need to continually halt a process to perform repeated lookups for unobtainable shared objects.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
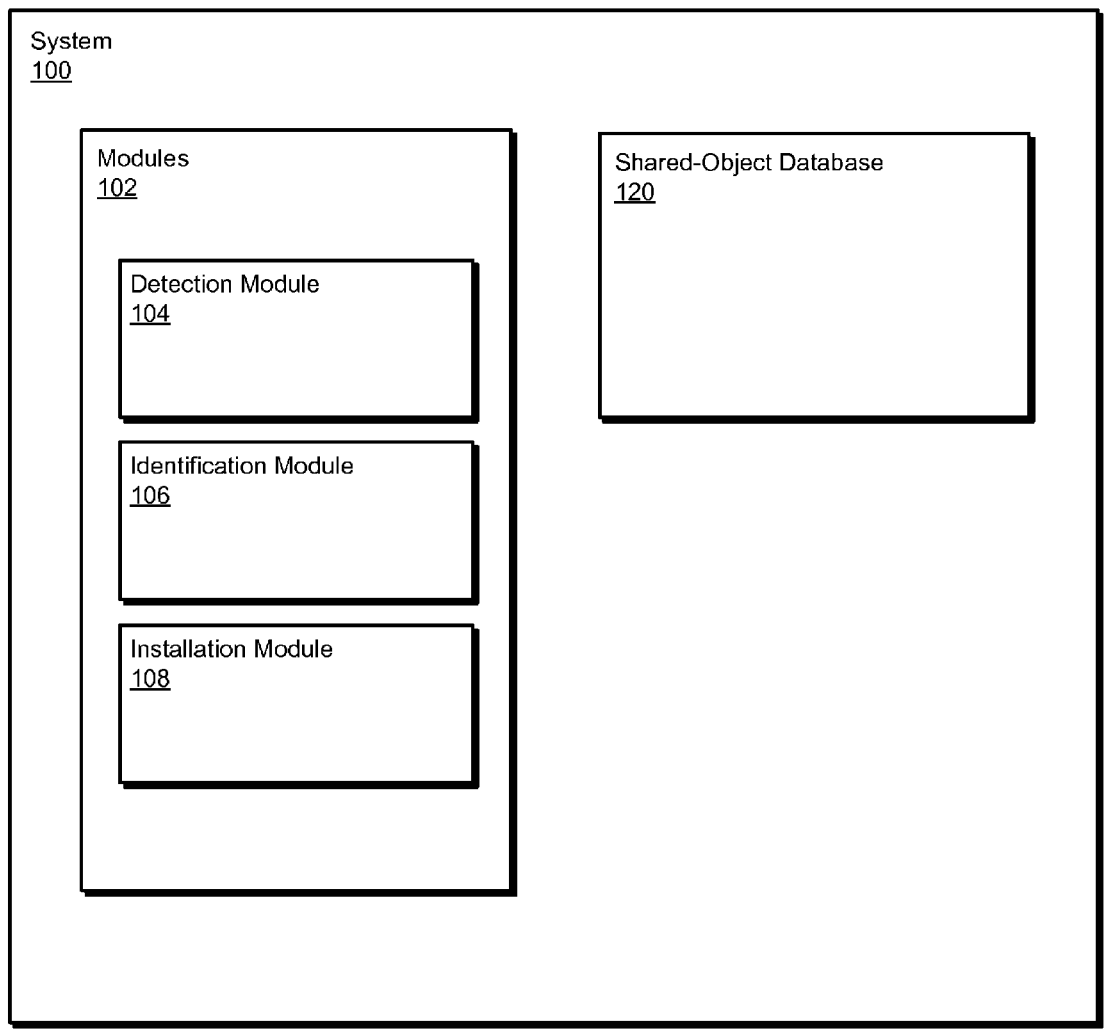
FIG. 1 is a block diagram of an exemplary system for detecting and automatically installing missing software components.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for detecting and automatically installing missing software components. The term "shared object," as used herein, generally refers to files that contain code and data that may be shared by independent programs. Examples of shared objects include dynamically-linked libraries, such as side-by-side (S×S)

DLLs, COM DLLs, standard (i.e., non-S×S DLLs and non-COM DLLs), or any other type or form of dynamically-linked library.

Figure 2:
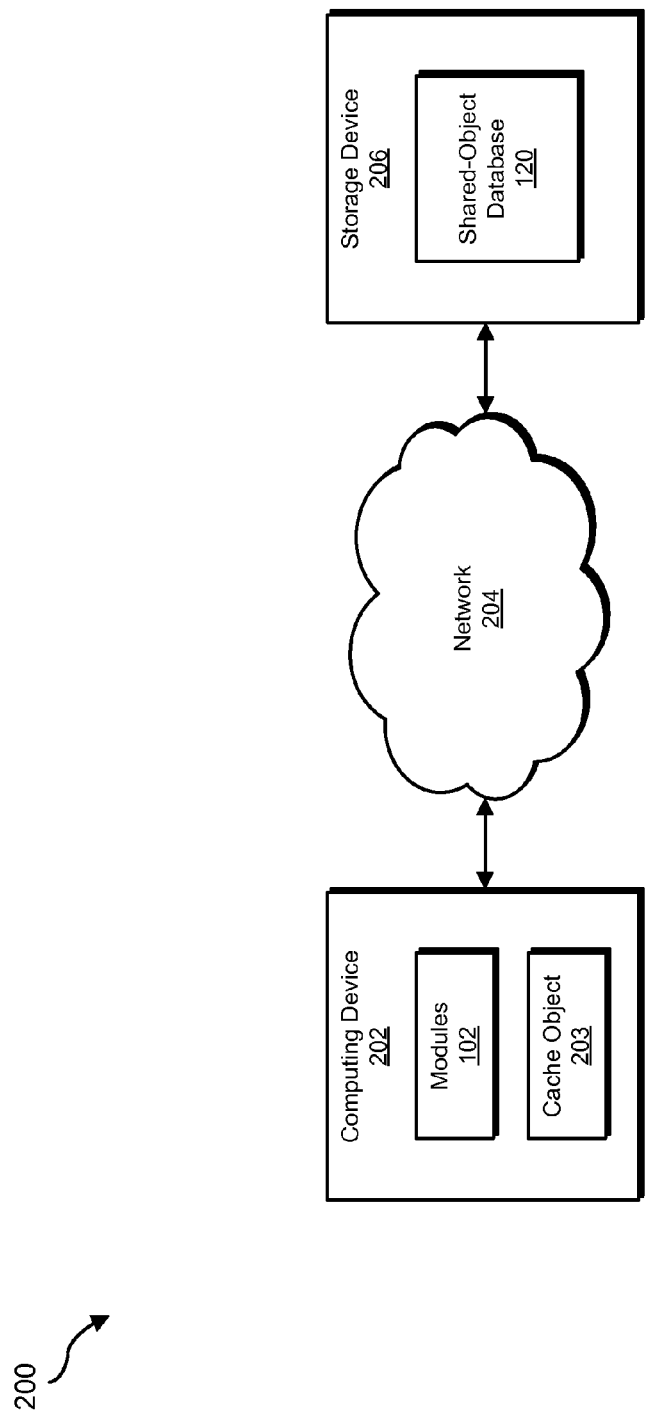
FIG. 2 is a block diagram of an exemplary system for detecting and automatically installing missing software components.

The following will provide, with reference to FIGS. 1-2, detailed descriptions of exemplary systems for detecting and automatically installing missing software components. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting and automatically installing missing software components. As illustrated in this figure, exemplary system 100 may comprise one or more modules for performing one or more tasks. For example, and as will be explained in greater detail below, exemplary system 100 may comprise a detection module 104 programmed to detect a failed attempt by a process to load a shared object. Exemplary system 100 may also comprise an identification module 106 programmed to identify missing shared objects.

In addition, and as will be described in greater detail below, exemplary system 100 may comprise an installation module 108 programmed to obtain, install, and successfully load missing shared objects. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also comprise a shared-object database 120. As will be explained in greater detail below, shared-object database 120 may contain multiple shared objects (such as DLLs) that may be retrieved by network-attached computing devices, as needed.

Shared-object database 120 may represent portions of a single database or computing device or a plurality of databases or computing devices. Database 120 may also represent a portion of one or more computing devices. For example, database 120 may represent a portion of storage device 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 and/or storage device 206 in FIG. 2, computing system 510 in FIG. 5, and/or portions of exemplary network architecture 600 in FIG. 6.

FIG. 2 is a block diagram of an exemplary system 200 for detecting and automatically installing missing software components. As illustrated in this figure, exemplary system 200 may comprise a computing device 202 in communication with a storage device 206 via a network 204.

As detailed above, modules 102 in FIG. 1 may be stored and configured to run on computing device 202. In one embodiment, and as will be described in greater detail below, modules 102 may be programmed to cause computing device 202 to: 1) detect a failed attempt by a process to load a shared object, 2) identify the shared object requested in the failed attempt, 3) automatically obtain the shared object from storage device 206, 4) install the shared object on computing device 202, and then 5) successfully load the shared object into memory of computing device 202.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, and any other suitable computing device.

In some examples, computing device 202 may comprise a local cache object 203. As will be explained in greater detail below, cache object 203 may contain information that identifies prior unsuccessful attempts to obtain missing shared objects. In some examples, the system may consult local cache object 203 prior to attempting to obtain a missing shared object from storage device 206 in order to determine whether the system has previously unsuccessfully attempted to obtain the shared object in question, thereby avoiding the need to continually halt a process to perform repeated look-ups for unobtainable shared objects.

Storage device 206 generally represents any type or form of network-accessible storage device. As explained above, in some examples storage device 206 may comprise shared-object database 120, which may contain multiple shared objects (such as DLLs) that may be retrieved by network-attached computing devices (such as computing device 202), as needed.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., GSM Network), exemplary network architecture 600 in FIG. 6, or the like. Network 204 may facilitate communication or data transfer using wireless or wired connections. In one embodiment, network 204 may facilitate communication between computing device 202 and storage device 206.

Figure 3:
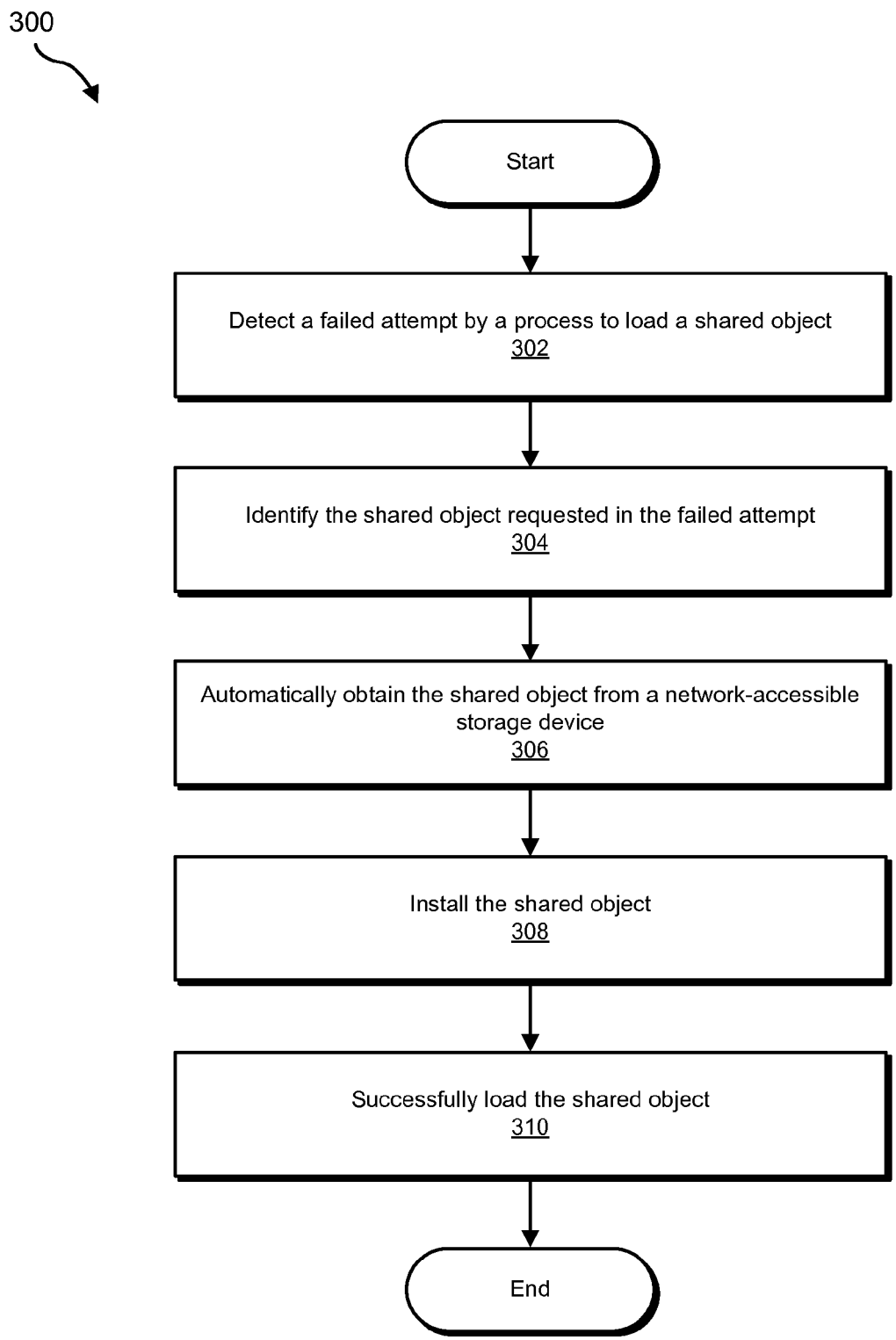
FIG. 3 is a flow diagram of an exemplary method for detecting and automatically installing missing software components.

FIG. 3 is a flow diagram of an exemplary computer-implemented method 300 for detecting and automatically installing missing software components. As illustrated in this figure, at step 302 the system may detect a failed attempt by a process to load a shared object. For example, detection module 104 in FIG. 1 (which may, as detailed above, be stored and configured to run on computing device 202 in FIG. 2) may detect a failed attempt by a process to load a DLL on computing device 202.

The system may perform step 302 in a variety of ways. In one example, the system may detect failed attempts to load shared objects using kernel-mode and/or user-mode drivers or hooks. For example, detection module 104 in FIG. 1 may represent a kernel-mode or user-mode driver or hook programmed to intercept error messages that identify failed attempts by a process to load a DLL.

Figure 4:
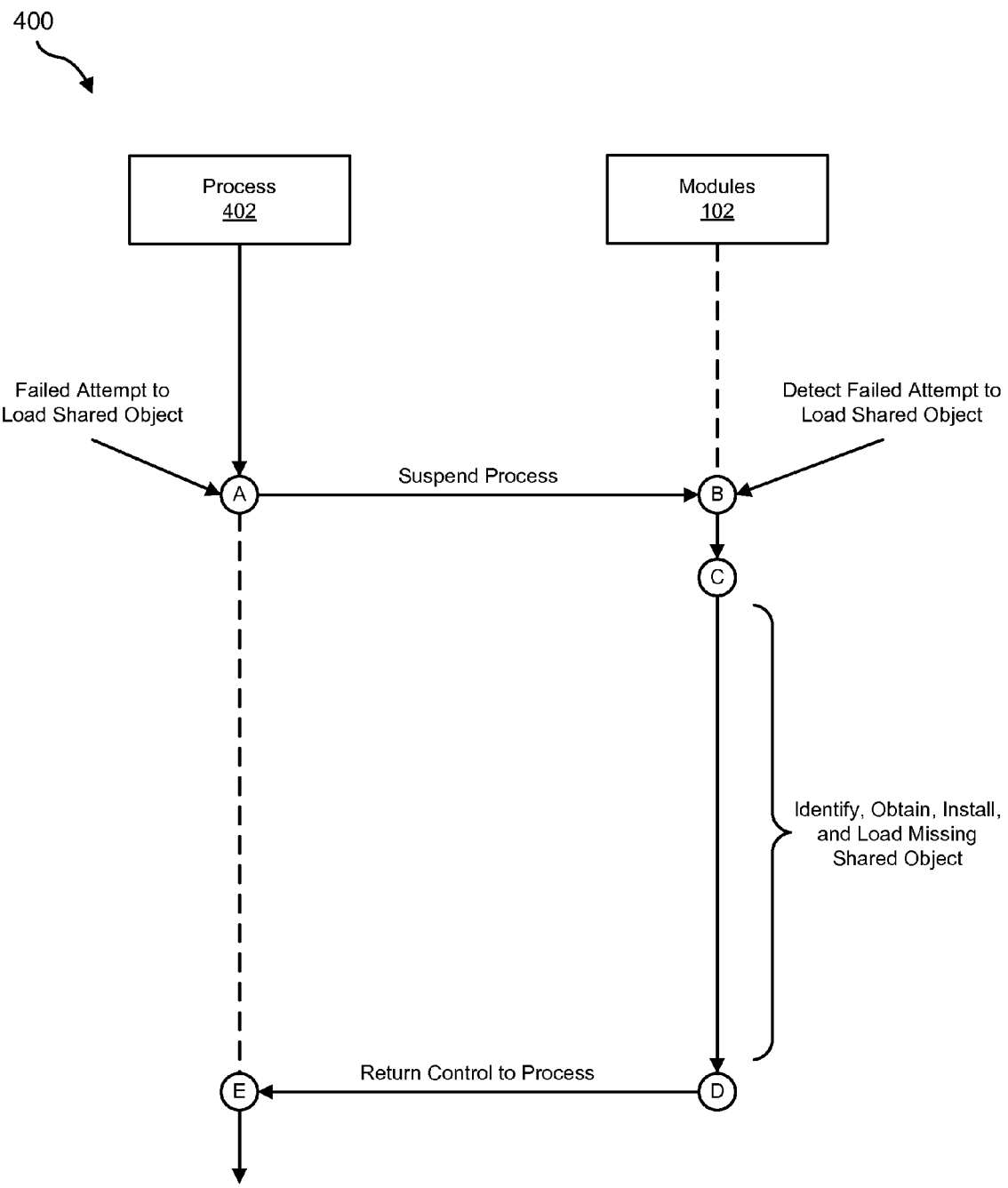
FIG. 4 is a diagram illustrating an exemplary control flow for detecting and automatically installing missing software components.

In some examples, the system may, upon detecting a failed attempt by a process to load a shared object in step 302, suspend the requesting process. For example, as illustrated in FIG. 4, modules 102 (comprising, for example, detection module 104, identification module 106, and installation module 108) may, upon detecting a failed attempt by process 402 to load a shared object at point B, suspend operation of process 402. In some examples, modules 102 may suspend process 402 while modules 102 attempt to obtain, install, and load the missing shared object, as will be explained in greater detail below.

At step 304, the system may identify the shared object requested in the failed attempt identified in step 302. For example, identification module 106 in FIG. 1 (which may, as detailed above, be stored and configured to run on computing device 202 in FIG. 2) may identify the DLL requested in the failed attempt identified in step 302.

The system may identify shared objects in a variety of ways. For example, identification module 106 in FIG. 1 may, depending on the shared object's file type (e.g., depending on whether the shared object represents a standard DLL, COM DLL, or side-by-side DLL), identify the missing shared object based on the shared object's name (e.g., "printer.dll"), version information (e.g., the version number of a DLL, the language version, such as English or German, of the DLL, or the like), an interface identifier (IID) associated with the shared object, an object identifier (OBJID) associated with the shared object, at least one import address table (IAT) entry associated with the shared object (i.e., IAT entries generated by the process that reference the missing DLL), and/or information contained within a manifest of an executable file responsible for launching the process.

For example, for a side-by-side DLL, identification module 106 may retrieve, from a side-by-side manifest contained within an executable file responsible for launching the process identified in step 302, information that identifies the DLL's filename (e.g., printer.dll), version (e.g., 1.012), language (e.g., English), and a digital signature associated with the DLL.

Similarly, for COM DLLs, identification module 106 may identify the DLL's filename, the DLL's interface identifier, and the DLL's object identifier. For standard DLLs (i.e., non-COM DLLs and non-SxS DLLs), identification module 106 may identify the DLL's filename and entries that are associated with the DLL contained within an import address table associated with the process attempting to load the DLL.

At step 306, the system may automatically obtain the shared object identified in step 304 from a network-accessible storage device. For example, installation module 108 in FIG. 1 (which may, as detailed above, be stored and configured to run on computing device 202 in FIG. 2) may automatically obtain the DLL identified in step 304 from storage device 206 in FIG. 2 via network 204.

The system may perform step 306 in a variety of ways. In one example, installation module 108 may automatically obtain the shared object identified in step 304 by: 1) transmitting a request for the shared object identified in step 304 to storage device 206 and then 2) receiving the shared object from storage device 206. In one example, the request may comprise metadata that identifies the shared object in question. Examples of such metadata include, without limitation, the shared object's name, version information associated with the shared object, an interface identifier associated with the shared object, an object identifier associated with the shared object, at least one import address table entry associated with the shared object, and/or a digital signature associated with the shared object.

The system may obtain simply a copy of the requested shared object or an installation package for installing the shared object on a computing device. For example, installation module 108 in FIG. 1 may obtain, from storage device 206 in FIG. 2, a copy of a requested DLL (e.g., "printer.dll") or an installation package (e.g., "printer_dll.exe") for installing the DLL. In some examples, the installation package may, in addition to installing the shared object in question, also complete additional installation requirements or install additional dependencies necessary for proper execution of the shared object.

At step 308, the system may install the shared object obtained in step 306. For example, installation module 108 in FIG. 1 (which may, as detailed above, be stored and configured to run on computing device 202 in FIG. 2) may install the DLL obtained in step 306 onto computing device 202.

In one example, the system may install the shared object obtained in step 306 by simply storing the shared object in an appropriate location on the computing device. For example, for side-by-side DLLs, installation module 106 in FIG. 1 may simply store a copy of the DLL obtained at step 306 within a version-specific subfolder contained within a common system-wide side-by-side folder on computing device 202 (e.g., "C:\Windows\WinSxS"). Similarly, for standard (i.e., non-SxS DLLs and non-COM DLLs) installation module 108 may simply store a copy of the obtained DLL within the requesting application's folder (e.g., "C:\Program Files\Editor") or within a standard shared folder (e.g., "C:\Windows\System32").

In an additional example, the system may install the shared object by executing an installation package for the shared object obtained in step 306. For example, installation module 108 in FIG. 1 may execute the installation package "printer_dll.exe" for the DLL "printer.dll." In this example, the installation package may install additional dependencies or complete installation requirements that are necessary for proper operation of the DLL. In one example, the system may, by installing the missing shared component on the computing device, transform at least one characteristic or property of the computing device.

At step 310, the system may successfully load the shared object. For example, upon installing the DLL obtained in step 306, installation module 108 in FIG. 1 may successfully load this DLL into memory of computing device 202 in FIG. 2. Upon completion of step 310, exemplary method 300 in FIG. 3 may terminate.

In some examples, upon successfully loading the shared object in step 310, the system may return control to the requesting process. For example, as illustrated in FIG. 4, upon identifying, obtaining, installing, and successfully loading the missing shared object (points C-D in FIG. 4), modules 102 may return control to process 402, which may then continue execution at point E. In this example, by suspending the process immediately upon detecting a failed attempt by the process to load the missing shared object, the system may prevent the process from encountering errors due to missing software components.

Alternatively, if the system is unable to obtain a copy of the missing shared object from the network-accessible storage device, then the system may return control to the requesting process, which may then encounter errors due to the missing shared object.

In some examples, modules 102 in FIG. 1 may create a local cache object that contains information that identifies prior unsuccessful attempts to obtain missing shared objects. For example, identification module 106 in FIG. 1 may create and store a local cache object 203 on computing device 202 in FIG. 2. In this example, local cache object 203 may contain information that identifies prior unsuccessful attempts by identification module 106 to obtain missing shared objects from storage device 206 in FIG. 2. For example, if identification module 106 unsuccessfully attempts to obtain the DLL "displaymax.dll" from storage device 206 (e.g., if the DLL "displaymax.dll" is not contained within shared-object database 120 on storage device 206 in FIG. 2), then identification module 106 may store information that identifies the failed attempt to obtain the DLL "displaymax.dll" from storage device 206 in local cache object 203.

In some examples, exemplary method 300 in FIG. 3 may also comprise, prior to attempting to automatically obtain a missing shared object in step 306, determining whether the system has previously unsuccessfully attempted to obtain the missing shared object from the network-accessible storage device. For example, upon identifying a failed attempt to load the DLL "displaymax.dll," identification module 106 in FIG. 1 may determine, by analyzing local cache object 203 on computing device 202 in FIG. 2, whether installation module 108 has previously and unsuccessfully attempted to obtain this DLL from storage device 206 in FIG. 2. If the system determines that it has previously unsuccessfully attempted to obtain this DLL, then the system may return control to the process identified in step 302 without attempting to obtain the DLL in question, thereby avoiding the need to continually halt a process to perform repeated lookups for unobtainable shared objects.

By automatically identifying, obtaining, and installing missing software components, the systems and methods disclosed herein may successfully resolve problems caused by missing software components in partially installed applications, damaged applications, or applications that are not packaged with execution packages. The systems and methods described herein may also automatically resolve failed attempts to load a newer version of a DLL that is currently installed on a system since these systems and methods may automatically identify, obtain, install, and load a newer version of the DLL in question from a network-accessible storage device. As such, the systems and methods disclosed herein may reduce user frustration by avoiding the need to manually identify and obtain copies of missing software components.

Figure 5:
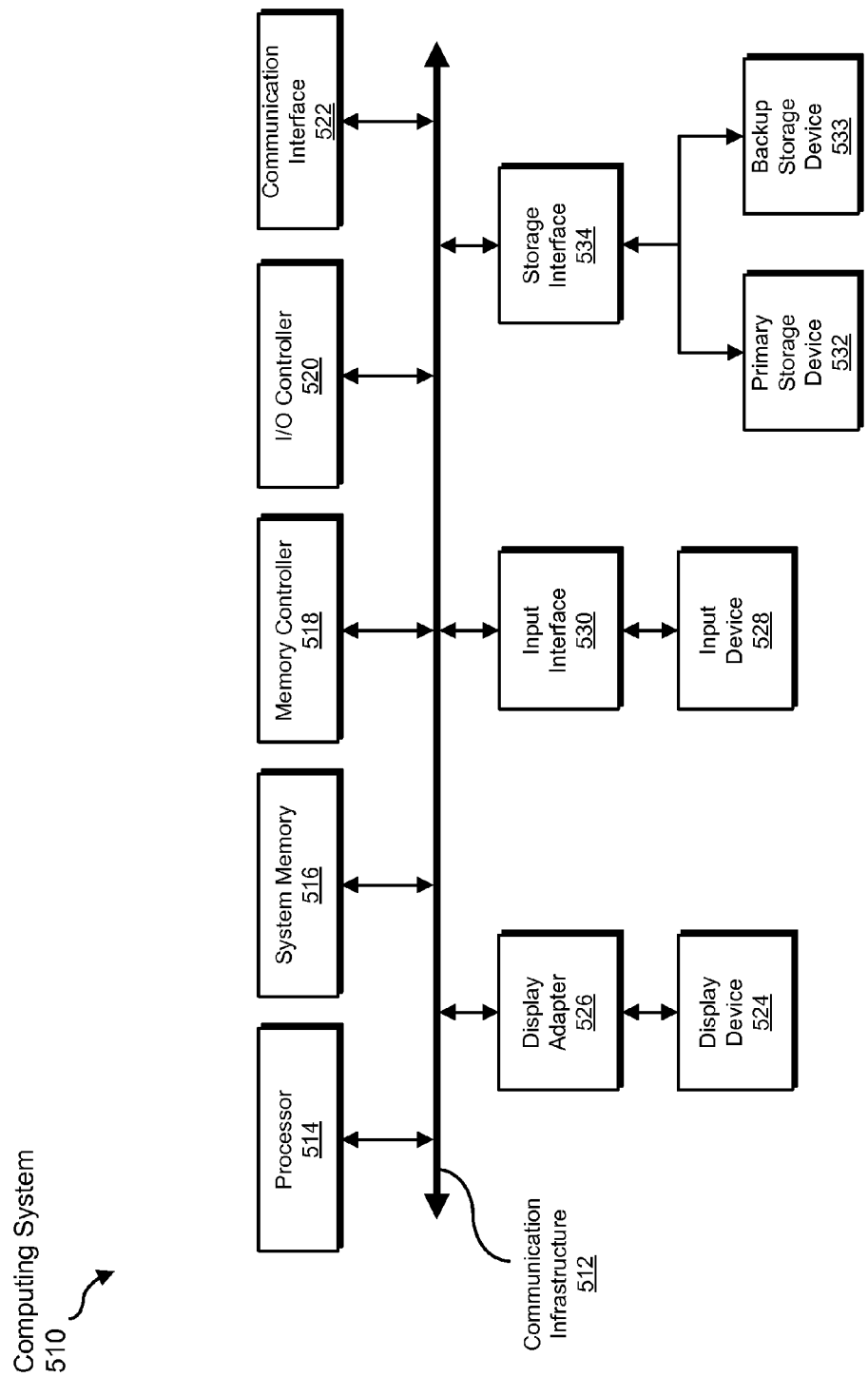
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the detecting, identifying, obtaining, installing, loading, suspending, returning control, transmitting, receiving, determining, storing, and executing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as detecting, identifying, obtaining, installing, loading, suspending, returning control, transmitting, receiving, determining, storing, and executing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the detecting, identifying, obtaining, installing, loading, suspending, returning control, transmitting, receiving, determining, storing, and executing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the detecting, identifying, obtaining, installing, loading, suspending, returning control, transmitting, receiving, determining, storing, and executing steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the detecting, identifying, obtaining, installing, loading, suspending, returning control, transmitting, receiving, determining, storing, and executing steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the detecting, identifying, obtaining, installing, loading, suspending, returning control, transmitting, receiving, determining, storing, and executing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
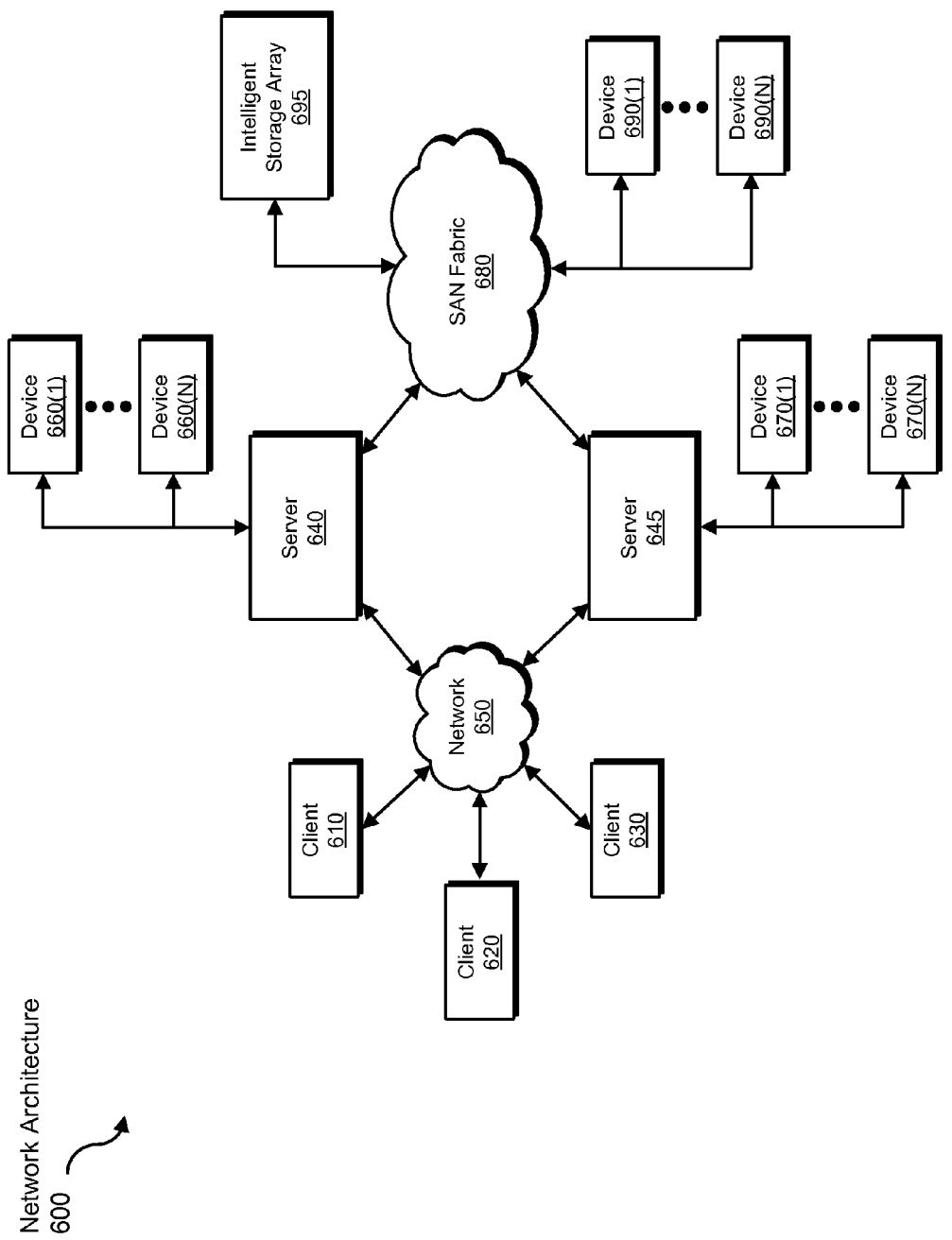
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the detecting, identifying, obtaining, installing, loading, suspending, returning control, transmitting, receiving, determining, storing, and executing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for detecting and automatically installing missing software components. Such a method may comprise: 1) detecting a failed attempt by a process to load a shared object, 2) identifying the shared object requested in the failed attempt, 3) automatically obtaining the shared object from a network-accessible storage device, 4) installing the shared object on the computing device, and then 5) successfully loading the shared object.

The method may also comprise, upon detecting the failed attempt to load the shared object, suspending the process. In addition, the method may comprise, upon successfully loading the shared object, returning control to the process.

In some examples, detecting the failed attempt to load the shared object may comprise detecting the failed attempt using a kernel-mode driver and/or a user-mode driver. In addition, identifying the shared object may comprise identifying the shared object based on the shared object's name, version information associated with the shared object, an interface identifier associated with the shared object, an object identifier associated with the shared object, at least one import address table entry associated with the shared object, and/or a digital signature associated with the shared object.

In some examples, automatically obtaining the shared object from the network-accessible storage device may comprise: 1) transmitting a request for the shared object to the network-accessible storage device, the request comprising metadata that identifies the shared object and then 2) receiving the shared object from the network-accessible storage device. In this example, the method may also comprise, prior to transmitting the request for the shared object to the network-accessible storage device, determining that the shared object is not identified within a local cache object that identifies prior unsuccessful attempts to obtain shared objects.

In one example, automatically obtaining the shared object from the network-accessible storage device may comprise automatically obtaining an installation package for the shared object from the network-accessible storage device. In addition, installing the shared object on the computing device may comprise storing the shared object on the computing device or executing an installation package for the shared object. The shared object comprises a dynamically-linked library, such as a side-by-side DLL, a COM DLL, and a standard DLL.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting and automatically installing missing software components, at least a portion of the method being performed by a computing device comprising at least one processor, the method comprising:
    detecting a failed attempt by a process to load a shared object;
    identifying the shared object requested in the failed attempt;
    automatically obtaining the shared object from a network-accessible storage device at least in part by:
        determining that the shared object is not identified within a local cache object that identifies prior unsuccessful attempts to obtain shared objects;
        upon determining that the shared object is not identified within the local cache object, transmitting a request for the shared object to the network-accessible storage device, the request comprising metadata that identifies the shared object;
        receiving the shared object from the network-accessible storage device;
    installing the shared object on the computing device;
    successfully loading the shared object.

2. The method of claim 1, further comprising, upon detecting the failed attempt to load the shared object, suspending the process.

3. The method of claim 2, further comprising, upon successfully loading the shared object, returning control to the process.

4. The method of claim 1, wherein detecting the failed attempt to load the shared object comprises detecting the failed attempt using at least one of:
    a kernel-mode driver;
    a user-mode driver.

5. The method of claim 1, wherein identifying the shared object comprises identifying the shared object based on at least one of:
    the shared object's name;
    version information associated with the shared object;
    an interface identifier associated with the shared object;
    an object identifier associated with the shared object;
    at least one import address table entry associated with the shared object;
    a digital signature associated with the shared object.

6. The method of claim 1, wherein automatically obtaining the shared object from the network-accessible storage device comprises automatically obtaining an installation package for the shared object from the network-accessible storage device.

7. The method of claim 1, wherein installing the shared object on the computing device comprises:
    storing the shared object on the computing device;
    executing an installation package for the shared object.

8. The method of claim 1, wherein the shared object comprises a dynamically-linked library.

9. The method of claim 8, wherein the dynamically-linked library comprises one of:
    a side-by-side DLL;
    a COM DLL;
    a standard DLL.

10. A system for detecting and automatically installing missing software components, the system comprising:
    a detection module programmed to detect a failed attempt by a process to load a shared object;
    an identification module programmed to identify the shared object requested in the failed attempt;
    a local cache object that identifies prior unsuccessful attempts to obtain shared objects;
    an installation module programmed to:
        automatically obtain the shared object from a network-accessible storage device at least in part by:
            determining that the shared object is not identified within the local cache object;
            upon determining that the shared object is not identified within the local cache object, transmitting a request for the shared object to the network-accessible storage device, the request comprising metadata that identifies the shared object;
            receiving the shared object from the network-accessible storage device;
        install the shared object on the computing device;
        successfully load the shared object;
    at least one processor configured to execute at least one of the detection module, the identification module, and the installation module.

11. The system of claim 10, wherein the detection module is further programmed to suspend the process upon detecting the failed attempt to load the shared object.

12. The system of claim 11, wherein the installation module is further programmed to return control to the process upon successfully loading the shared object.

13. The system of claim 10, wherein the detection module comprises at least one of:
    a kernel-mode driver;
    a user-mode driver.

14. The system of claim 10, wherein the installation module automatically obtains the shared object from the network-accessible storage device by automatically obtaining an installation package for the shared object from the network-accessible storage device.

15. The system of claim 10, wherein the installation module installs the shared object on the computing device by:
    storing the shared object on the computing device;
    executing an installation package for the shared object.

16. A computer-readable storage medium comprising computer-readable instructions that, when executed by a processor of a computing device, cause the computing device to:
    detect a failed attempt by a process to load a shared object;

identify the shared object requested in the failed attempt;
automatically obtain the shared object from a network-accessible storage device at least in part by:
    determining that the shared object is not identified within a local cache object that identifies prior unsuccessful attempts to obtain shared objects;
    upon determining that the shared object is not identified within the local cache object, transmitting a request for the shared object to the network-accessible storage device, the request comprising metadata that identifies the shared object;
    receiving the shared object from the network-accessible storage device;
install the shared object on the computing device;
successfully load the shared object.

\* \* \* \* \*